United States Patent
Li et al.

(10) Patent No.: US 10,802,927 B2
(45) Date of Patent: Oct. 13, 2020

(54) SYSTEM AND METHOD FOR CHECKING AND CHARACTERIZING SNAPSHOT METADATA USING SNAPSHOT METADATA DATABASE

(71) Applicant: VMware, Inc., Palo Alto, CA (US)

(72) Inventors: Cheng Li, Palo Alto, CA (US); Li Ding, Cupertino, CA (US); Bret Needle, Foster City, CA (US); Mayank Rawat, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 302 days.

(21) Appl. No.: 15/354,984

(22) Filed: Nov. 17, 2016

(65) Prior Publication Data
US 2018/0137014 A1 May 17, 2018

(51) Int. Cl.
*G06F 16/00* (2019.01)
*G06F 11/14* (2006.01)
*G06F 16/11* (2019.01)

(52) U.S. Cl.
CPC ........ *G06F 11/1458* (2013.01); *G06F 16/128* (2019.01); *G06F 2201/815* (2013.01)

(58) Field of Classification Search
CPC ........... G06F 11/1458; G06F 17/30088; G06F 2201/84; G06F 16/128; G06F 2201/815
See application file for complete search history.

(56) References Cited

U.S. PATENT DOCUMENTS

| 8,789,208 B1* | 7/2014 | Sundaram ............... H04L 29/06 726/29 |
| 9,753,812 B2* | 9/2017 | Pawar .................. G06F 16/128 |
| 9,823,940 B2* | 11/2017 | Arcese ............... G06F 9/45558 |
| 2009/0271581 A1* | 10/2009 | Hinrichs, Jr. ....... G06F 11/1441 711/162 |
| 2013/0006939 A1* | 1/2013 | Hinrichs, Jr. ....... G06F 11/1441 707/639 |
| 2014/0040199 A1* | 2/2014 | Golab ............... G06F 17/30309 707/634 |
| 2014/0244935 A1* | 8/2014 | Ezra ...................... G06F 3/0614 711/133 |
| 2015/0143063 A1* | 5/2015 | Mutalik .............. G06F 11/1451 711/162 |
| 2015/0212893 A1* | 7/2015 | Pawar ................. G06F 9/45558 707/649 |
| 2015/0212894 A1* | 7/2015 | Pawar ................. G06F 11/1469 707/679 |
| 2015/0212895 A1* | 7/2015 | Pawar ................. G06F 11/1451 707/649 |

(Continued)

OTHER PUBLICATIONS

Haryadi S. Gunawi et al., SQCK: A Declarative File System Checker, 8th USENIX Symposium on Operating Design and Implementation (Year: 2008).*

(Continued)

*Primary Examiner* — Jean M Corrielus
(74) *Attorney, Agent, or Firm* — Loza & Loza, LLP (57) ABSTRACT

System and method for checking and characterizing metadata of snapshots utilize a snapshot metadata database to execute at least one of checking and characterizing operations on the metadata of snapshots. The snapshot metadata database includes information extracted from backing storage elements containing the metadata of snapshots.

16 Claims, 5 Drawing Sheets

(56) References Cited

U.S. PATENT DOCUMENTS

| | | | |
|---|---|---|---|
| 2015/0212896 A1* | 7/2015 | Pawar | G06F 16/128 |
| | | | 707/648 |
| 2017/0300248 A1* | 10/2017 | Purohit | G06F 3/0619 |
| 2018/0113623 A1* | 4/2018 | Sancheti | G06F 3/065 |
| 2018/0196821 A1* | 7/2018 | Kottomtharayil | G06F 11/1448 |

OTHER PUBLICATIONS

E. Anderson et al., "DataSeries: An Efficient, Flexible Data Format for Structured Serial Data," SIGOPS Oper. Syst. Rev., 2009.

J. M. Carreira et al., "Scalable Testing of File System Checkers," EuroSys, 2012.

J. Cipar et al., "LazyBase: Trading Freshness for Performance in a Scalable Database," EuroSys, 2012.

G. W. Dunlap et al., "ReVirt: Enabling Intrusion Analysis through Virtual-Machine Logging and Replay," SIGOPS Oper. Syst. Rev., 2002.

D. Fryer et al., "Recon: Verifying File System Consistency at Runtime," File and Storage Technologies "FAST", 2012.

R. Funk. fsck, 2015. https://en.wikipedia.org/wiki/Fsck.

H. S. Gunawi et al., "SQCK: A Declarative File System Checker," OSDI, 2008.

D. Hitz, J. Lau, and M. Malcolm, "File System Design for an NFS File Server Appliance," USENIX Winter, 1994.

H. H. Huang et al., "Just-In-Time Analytics on Large File Systems." FAST, 2011.

C. Johnson et al., "From Research to Practice: Experiences Engineering a Production Metadata Database for a Scale Out File System," FAST, 2014.

P. L. Lehman and S. B. Yao, "Efficient Locking for Concurrent Operations on B-trees," ACM Trans. Database Syst., 6(4), Dec. 1981.

A. W. Leung et al., "Spyglass: Fast, Scalable Metadata Search for Large-Scale Storage Systems," FAST, 2009.

L. Lu et al., "VDFS: A Cloud-Centric Virtual Distributed File System," Radio, 2015.

A. Ma et al., "ffsck: The Fast File System Checker," ACM TOS, 2014.

M. K. McKusick et al., "A Fast File System for UNIX," ACM TOCS, 1984.

C. Mohan et al., "ARIES: A Transaction Recovery Method Supporting Fine-Granularity Locking and Partial Rollbacks Using Write-Ahead Logging," ACM TODS, 1992.

Y. Mond and Y. Raz, "Concurrency Control in B+-trees Databases Using Preparatory Operations," VLDB, 1985.

Z. Peterson and R. Burns, "Ext3cow: A Time-Shifting File System for Regulatory Compliance," ACM TOS, 2005.

B. Pfaff, T. Garfinkel, and M. Rosenblum, "Virtualization Aware File Systems: Getting Beyond the Limitations of Virtual Disks," NSDI, 2006.

O. Rodeh, "B-trees, Shadowing, and Clones," ACM TOS, 2008.

O. Rodeh, J. Bacik, and C. Mason, "BTRFS: The Linux B-Tree Filesystem," ACM TOS, 2013.

V. Srinivasan and M. J. Carey, "Performance of B+ Tree Concurrency Control Algorithms," SIGMOD Rec., 20(2), Apr. 1991.

S. Subramanian et al., "Snapshots in a Flash with ioSnap," EuroSys, 2014.

\* cited by examiner

SYSTEM AND METHOD FOR CHECKING AND CHARACTERIZING SNAPSHOT METADATA USING SNAPSHOT METADATA DATABASE

BACKGROUND

Snapshot technology is commonly used to preserve point-in-time state of a file system and/or a block store, which allows strong data isolation and versioning.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques. Recent advances have shown promising performance and scalability benefits when leveraging B+ tree structures in designing snapshot system.

However, verifying the correctness of a B+ tree based snapshot system remains to be a challenging task. A new problem arises for checking and characterizing B+ tree based snapshot systems since the snapshot structure is intertwined and complex as snapshot sizes and snapshot numbers continue to grow. This difficulty is exacerbated by the fact that storage verification programs are error-prone and difficult to debug or maintain.

BRIEF DESCRIPTION OF THE DRAWINGS

Throughout the description, similar reference numbers may be used to identify similar elements.

DETAILED DESCRIPTION

Figure 1:
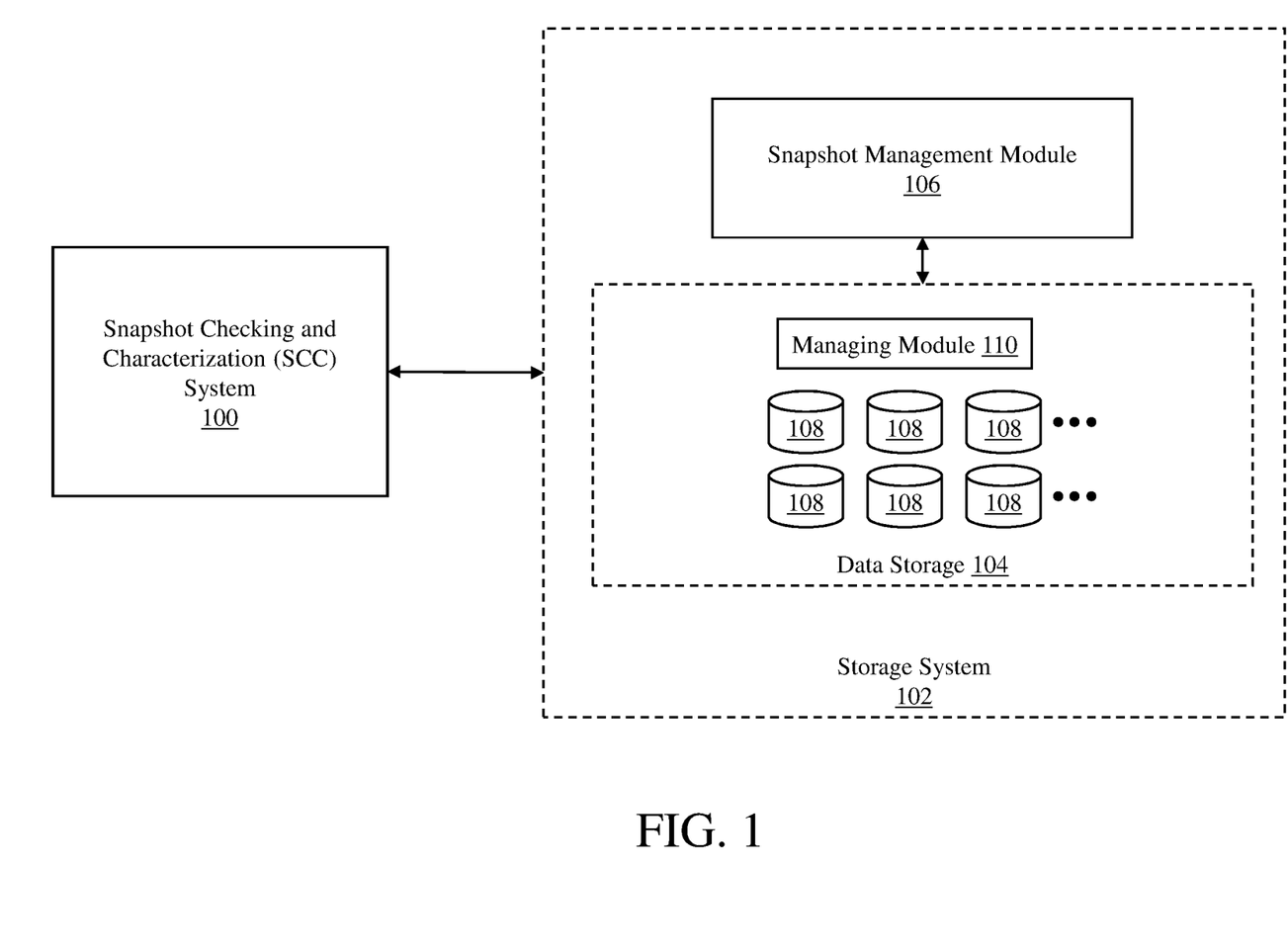
FIG. 1 is a block diagram of a snapshot checking and characterization (SCC) system and a storage system in accordance with an embodiment of the invention.

FIG. 1 shows a snapshot checking and characterization (SCC) system 100 in accordance with an embodiment. As explained in detail below, the SCC system 100 provides consistency checking and characterization analytics of metadata of a snapshot storage system 102, which may be a virtualized snapshot storage system, with performance comparable to traditional storage verification systems. In addition, the SCC system 100 can be implemented with significantly fewer lines-of-code compared to traditional storage verification systems, which improves understandability and debuggability of the system.

As illustrated in FIG. 1, the snapshot storage system 102 includes data storage 104 and a snapshot management module 106. The data storage 104 includes one or more computer data storage devices 108, which can be any type of storage devices, such as solid-state devices (SSDs), hard disks or a combination of the two. Some of these storage devices 108 may be local storage devices of computers, e.g., locally attached disks or SSDs within the computers. Some of the storage devices 108 may operate as components of a network-attached storage (NAS) and/or a storage area network (SAN). The data storage 106 may include a storage managing module 110, which manages the operation of the data storage. In an embodiment, the storage managing module 110 is a computer program executing on one or more computer systems (not shown) of the storage. The data storage 104 may be used to store data in any logical storage units, such as file systems, datastores, virtual volumes (VVOLs). In addition, the data storage may be used to store snapshots of any of these logical storage units or snapshots of applications using the data storage, such as virtual computing instances. As used herein, the term "virtual computing instance" is any software entity that can run on a computer system, such as a software application, a software process, a virtual machine (VM) and a "container" that provides system-level process isolation, such as a Docker container. Snapshots of virtual computer instances can be viewed as "images" of the virtual computer instances at the time when the snapshots were taken or created. As an example, a snapshot of a VM is a copy of the non-volatile memory or virtual disk of the VM, as well as the volatile memory of the VM, at the time the snapshot was taken. A VM snapshot may also include the configuration or settings of the VM and the BIOS configuration at the time the snapshot was taken.

The snapshot management module 106 of the snapshot storage system 102 operates generate snapshots, which are stored in the data storage 104. These snapshots include data, as well as metadata. The snapshot management module 106 may be implemented as part of a virtualization software, such as VMware® ESXi™ hypervisor provided as part of the VMware vSphere® solution made commercially available from VMware, Inc., to run in the kernel space of a computer system. In an embodiment, the snapshot management module 106 leverages copy-on-write (COW) B+ tree structures to organize data across snapshots taken at different times. The architecture of snapshot metadata in accordance with an embodiment of the invention is shown in FIG. 2.

Figure 2:
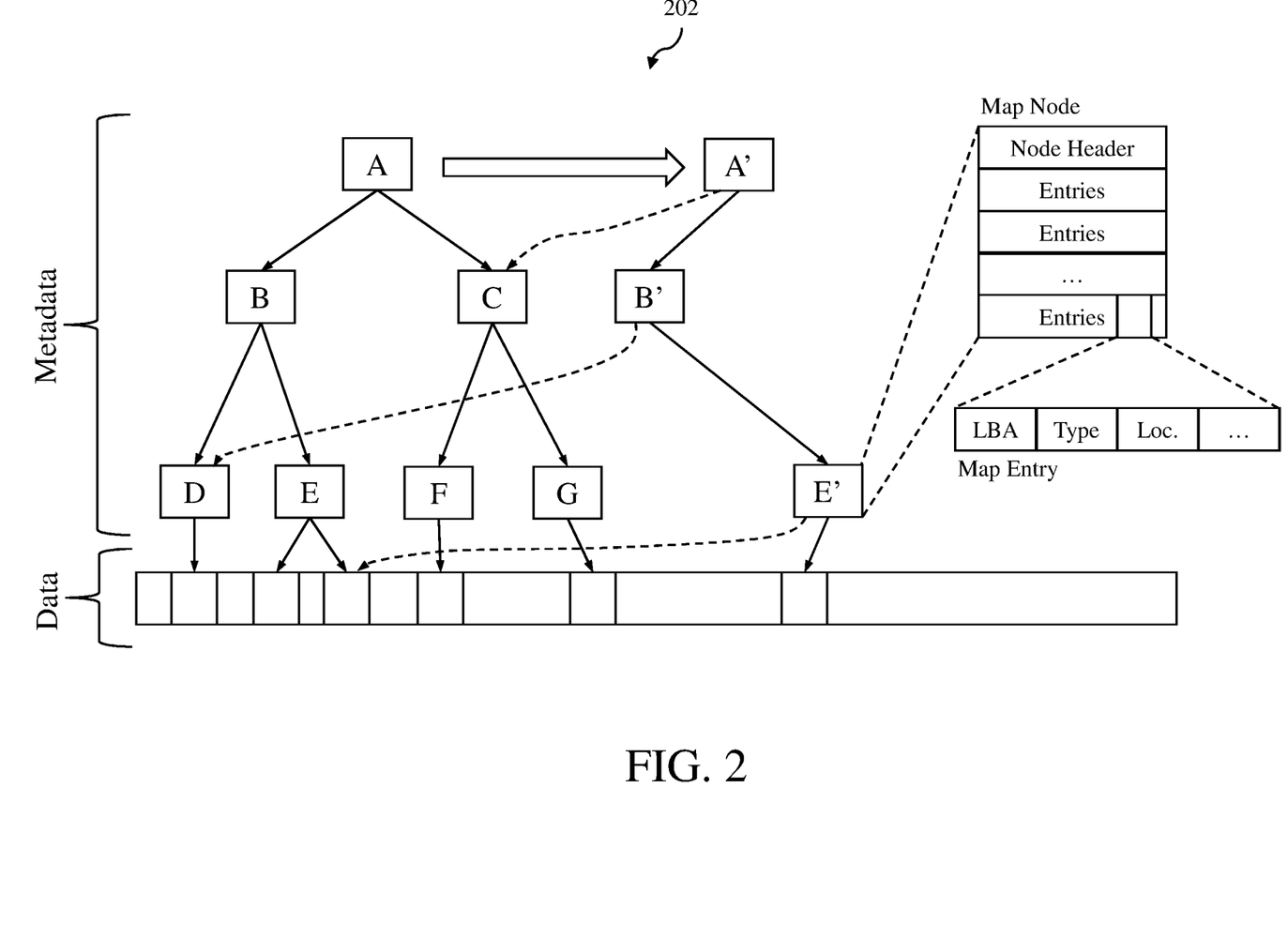
FIG. 2 is a diagram of an architecture of snapshot metadata in accordance with an embodiment of the invention.

In FIG. 2, metadata of two snapshots is arranged in a B+ tree structure 202. The metadata of the first snapshot is represented by nodes A-G in the B+ tree structure, which define one tree of the B+ tree structure (or one sub-tree if the entire B+ tree structure is viewed as being a single tree). The node A is the root node of the tree of the first snapshot. The nodes B and C are index nodes of the tree. The nodes D-G are leaf nodes of the tree, which are nodes on the bottom layer of the tree. The metadata of the second snapshot, which is created or taken at a later time with respect to the first snapshot, is represented by nodes A', B' and E', as well as the nodes C, F and G, which are common nodes for both the first and second snapshot. Each root node contains references or entries that point to index nodes. Each index node contains references or entries that point to other index nodes. Each leaf node records the mapping from snapshot logic block address (LBA) to the physical extent location in the stored backing files (referenced as "data" in FIG. 2). Each node in the B+ tree structure includes a node header and a number of entries, as illustrated by a map node, which is a representation of the leaf node E'. The node header includes information regarding that particular node, such as an identification (ID) of the node. Each entry in the map nodes includes an LBA, the entry type (e.g., private or shared), physical extent location in the stored backing files, checksum and other characteristics of the data for this entry, as illustrated by a map entry, which represents one of the entries in the leaf node E'. Once a snapshot is created or taken, nodes in the old snapshot becomes immutable (i.e., cannot be modified), which allows preservation of versioned data. In FIG. 2, when the second snapshot is created, the nodes A-G of the first snapshot becomes immutable.

The architecture of snapshot metadata allows for various operations to follow changes after the snapshot was taken, such as insertion operations and overwrite operations. On insertion operation, COW operation is used to create new nodes and entries from the versioned root node to the leaf nodes. This is illustrated by the nodes A', B' and E' in FIG. 2. As the number of snapshots increases, the metadata nodes may contain entries that are either referenced once or multiple times, which are referred to as private and shared entries, respectively. On overwrite operation, the entry type may change from shared to private. For overwrite and deletion operations, entries are constantly split and merged, and nodes are rebalanced to maintain the minimized B+ tree height property. Thus, the complexity of the B+ tree structure will significantly increase as more snapshots are created.

In addition, as the number of snapshots grows, the metadata size will also significantly increase. As an example, let's consider the metadata size of a 512 GB virtual disk with 200 snapshots. Assuming an average extent size of 4 KB and 200-300 entries per node of the B+ tree structure, the total number of nodes and entries are 0.5 million and 128 million, respectively. Thus, the metadata size can be up to 16 GB. As the requirement of more snapshots continues to grow, this number can increase significantly.

The SCC system 100 is designed to address the size and complexity of the snapshot structure. In an embodiment, the snapshot management module 106, which generates and manages the B+ tree snapshot structure, is a software snapshot solution that is above the file system or block stores. Thus, the physical data recovery is delegated to the underlying systems (e.g., Virtual Machine File System (VMFS), Virtual Storage Area Network (VSAN), and VisualVSN Distributed File System (VDFS)). For metadata correctness, the SCC system focuses on changes to the snapshot metadata. In an embodiment, operations that make changes to the snapshot metadata, which typically involve changes to the B+ tree snapshot structures, are defined as "extending write" operations. Thus, the SCC system can be aware of changes to the B+ tree snapshot structures by monitoring the "extending write" operations in a computer system.

In addition, unlike traditional file system checkers, the SCC system 100 is designed to use a structured data representation, as explained below, to check the snapshot metadata in order to increase performance. Traditional file system checkers traverse logical metadata hierarchy by reading all blocks and/or their headers at least once, and often, multiple times. However, this approach does not work well in a snapshot system because logical metadata walk causes random input/outputs (I/Os) since stored metadata for linked tree nodes is not stored in any sequence, as illustrated in FIG. 2, thus resulting in poor performance.

Figure 3:
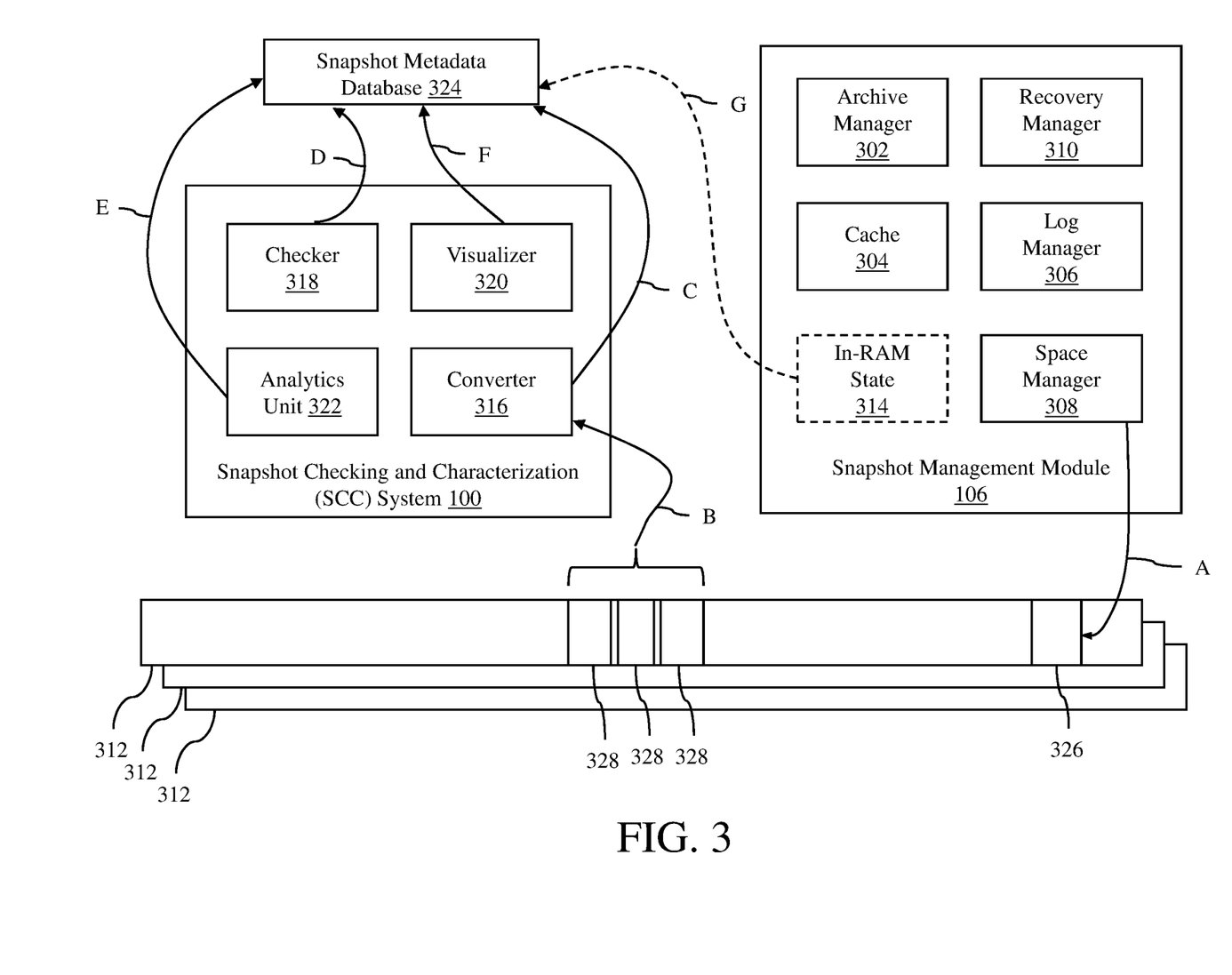
FIG. 3 is a block diagram of the SCC system and the snapshot management module of the snapshot storage system in accordance with an embodiment of the invention.

The SCC system 100 and the snapshot management module 106 of the snapshot storage system 102 will be described with references to FIG. 3, which shows components of the SCC system and the snapshot management module. In FIG. 3, the snapshot management module 106 includes a snapshot namespace archive manager 302, metadata cache 304, a log manager 306, a space manager 308 and a recovery manager 310. These components of the snapshot management module 106 may be implemented in any combination of hardware, software and firmware. In some implementations, these components of the snapshot management module 106 are implemented as one or more software programs running on one or more physical computer systems using one or more processors associated with the physical computer systems.

The snapshot namespace archive manager 302 operates to manage snapshot namespace and other snapshot properties. The space manager 308 operates to store snapshot metadata and data in blocks of storage elements 312, which may be backing files or backing objects, which are stored in the data storage 104. As part of this operation, the space manager periodically checkpoints state using snapshot information stored in the metadata cache 304 and in volatile memory associated with the snapshot management module 106 (shown in FIG. 3 as in-RAM state 314). The metadata cache 304 stores popular metadata blocks, i.e., metadata blocks that were recently modified. The log and recovery managers 306 and 308 operate to execute transactions for persistence and recovering from host crash or power outage.

The SCC system 100 includes a converter 316, a checker 318, a visualizer 320 and an analytics unit 322. These components of the SCC system may also be implemented in any combination of hardware, software and firmware. In some implementations, these components of the snapshot verification system are implemented as one or more software programs running on one or more physical computer systems using one or more processors associated with the physical computer systems. In an embodiment, the SCC system runs on the same computer system as the snapshot management module 106.

The converter 316 of the SCC system 100 operates to transform the snapshot metadata stored in the storage elements 312, e.g., in backing files/objects, into a snapshot metadata database 324, which may be a relational database. This is achieved by sequentially reading the snapshot metadata stored in the storage elements and extracting relevant information from the snapshot metadata to produce the snapshot metadata database 324. An example of the snapshot metadata database 324 generated by the converter 316 in accordance with an embodiment of the invention is shown in the following table:

TABLE 1

| Tables | Fields |
| --- | --- |
| Nodes | oid, offset, nodeType, treeType, version, entryCount, nextLBA, snapshotId, checkpointId |
| LeafEntries | entryId, lba, shared, entryOid, entryOffset, parentPhyId, parentPhyOffset |
| NonLeafEntries | same as LeafEntries |
| FreeLBAs | objectPhyId, objectPhyOffset, type |
| Constants | ConstantKey, ConstantValue |

The snapshot metadata database 324 shown in Table 1 includes tables and associated fields. The tables in the relational database include Nodes, LeafEntries, NonLeafEntries, FreeFBAs and Constants. The "Nodes" tables are tables for the different map nodes of B+ tree snapshot structures. The fields for the "Nodes" tables include oid, offset, nodeType, treeType, version, entryCount, nextLBA, snapshotId, checkpointId. The oid field includes the identification of each stored object, which may be a backing file or backing object. The offset field includes the location information of each stored object. The nodeType field includes the node type, e.g., root node, index node or leaf node. The treeType field includes the tree type for each node. The version field includes the version of each node. The entryCount field includes the entry count for each node. The nextLBA field includes the next LBA with respect to each node. The snapshotId field includes the identification of the snapshot for each node. The checkpointId field includes the identification of the checkpoint for each node.

The "LeafEntries" tables are tables for the leaf entries of the B+ tree snapshot structures. The fields for the "LeafEntries" tables include entryId, LBA, shared, entryOid, entryOffset, partyPhyId and parentPhyOffset. The entryId field includes the identification of each entry. The LBA field includes the LBA for each entry. The shared field includes an indication of whether each entry is shared or not. The entryOid field includes the identification of the node for each entry. The entryOffset field includes the offset of each entry. The parentPhyID field includes the identification of the parent for each entry. The parentPhyOffset field includes the location of each parent.

The "NonLeafEntries" tables are tables for the non-leaf entries of the B+ tree snapshot structures. The fields for the "NonLeafEntries" tables are the same as the fields for the "LeafEntries" tables.

The "FreeLBAs" tables are tables for the free LBAs of the B+ tree snapshot structures, e.g., data that has been freed due to deletion of a snapshot. The fields for the "FreeLBAs" tables include objectPhyId, objectPhyOffset and type. The objectPhyId field includes the identification of the physical object for each free LBA in the storage elements. The objectPhyOffset field includes the offset of the physical object for each free LBA. The type field includes the type of the free LBA, i.e., snapshot metadata backing object or snapshot data backing object.

The "Constants" tables are tables for the constants used by the snapshot management module 106. The fields for the "Constants" tables include ConstantKey and ConstantValue. The ConstantKey field includes the identification of each constant. The ConstantValue field includes the value for the associated constant. These key-values can be used to perform basic checks on the B+ tree snapshot structures.

Turning back to FIG. 3, the checker 318 of the SCC system 100 operates to use declarative query language, such as Structured Query Language (SQL), XQuery or Pig Latin, to check the correctness of snapshot metadata using the snapshot metadata database 324. In particular, the checker 318 uses declarative query language to check whether snapshot metadata structures, i.e., COW B+ tree structures, are consistent and coherent using the snapshot metadata database 324. Some of the checks executed by the checker 318 may include basic checks using the key-values in the "Constants" tables of the snapshot metadata database. As an example, if a key-value in the "Constants" tables defines the maximum or minimum number of entries allowed in each node, this key-value can be used to check whether any of the nodes in the B+ tree snapshot structures violate this rule. Other checks executed by the checker 318 may involve a more complex query to check the correctness of snapshot metadata using the snapshot metadata database.

In a particular implementation, the checker 318 is configured or programmed to selectively perform eleven (11) consistency checks for snapshots and linked clones, as well as an extra consistency check exclusively for linked clones. Consistency checks of stored data, such as snapshots and linked clones, are important since consistency errors can significantly impact performance of the computer system managing the stored data, for example, by requiring more CPU resources or causing file system errors. These consistency checks are shown in the following table:

TABLE 2

| No | Description | Use cases |
|---|---|---|
| 1 | Check whether the number of entries in a node is within the address space range specified by the range in the node header. | Snapshot, linked clone |
| 2 | Check whether if all entries in a node are uniquely referenced by a parent node | Snapshot, linked clone |
| 3 | Check whether any entry in a node are not referenced by any parent node | Snapshot, linked clone |
| 4 | Check whether the sum of freed space and allocated space equals the valid address space | Snapshot, linked clone |
| 5 | Check whether the address in the metadata entry are uniquely pointing to valid address in the data backing files | Snapshot, linked clone |
| 6 | Check whether the number of entries in one node are greater than the minimum node-split threshold and smaller than the maximum node-split threshold | Snapshot, linked clone |
| 7 | Check whether address space in allocated space and free space are exclusive (i.e., address appears in one does not appear in another) | Snapshot, linked clone |
| 8 | Check whether shared entry of a snapshot can be referenced by its predecessor snapshots | Snapshot, linked clone |
| 9 | Check whether private entry of a snapshot can only be referenced | Snapshot, linked clone |
| 10 | Check whether shared entry and private entries are exclusive | Snapshot, linked clone |
| 11 | Check whether all sub B+ trees are balanced or not | Snapshot, linked clone |
| 12 | Check whether blocks that are not referenced but allocated are used in earlier linked clone disks | Linked clone |

Linked clone is a shallow copying technique to create an instant clone of a storage object by leveraging snapshots. In linked clone, a separate virtual disk is created to maintain the delta changes relative to a source base disk. The SCC system 100 can support consistency checking for linked clones by walking through all archive files and building the linked clones hierarchical tree.

As noted above, the consistency checks performed by the checker 318 involve using declarative query language. Typically, a consistency check includes accessing the snapshot metadata database to retrieve particular information for at least a portion of B+ tree snapshot structures, such as index node entries for a subtree of a B+ tree snapshot structure, that are relevant to a constraint, which may be any of the constraints for checks in Table 2. The extracted information may then be manipulated or analyzed to derive some desired characteristics of the extracted information. The characteristics of the extracted information are then verified to see if the characteristics satisfy a condition of the constraint. As an example, below is a SQL code that can be used by the checker to verify whether all subtrees in a B+ tree snapshot structure are balanced or not, which is the constraint being checked. Balanced height property of a B+ tree is critical because it ensures the reduced cost when traversing from the root node to the leaf nodes.

```
# Step 1
CREATE TEMP VIEW subTreeView AS WITH RECURSIVE
    SubTrees ( depth , id , off , pid , poff ) AS (
        SELECT 1 , @vOid , @vOff , @vOid , @vOff
        UNION ALL
        SELECT depth +1 , entryOid , entryOffset , parentPhyId ,
            parentPhyOffset FROM SubTrees , NonLeafEntries
            WHERE parentPhyId = id AND parentPhyOf fset = off
            ORDER BY 1 DESC)
SELECT depth , id , off , pid , poff FROM SubTrees ;
# Step 2
CREATE TEMP VIEW treeNodeView AS SELECT depth , id , off ,
    pid , poff FROM subTreeView
    WHERE depth < (SELECT MAX( depth ) FROM subTreeView ) ;
# Step 3
SELECT COUNT( _ ) FROM treeNodeView INNER JOIN Nodes
    ON offset = pid AND offset = poff
    AND nodeType = 'LEAF_NODE' ;
```

The verification as set forth in the above code involves three steps. In step 1, a temporary view is created by the checker 318 to retrieve all the nodes given an oid and offset, which are denoted as variables @vOid and @vOff. Recursive SQL is used to calculate depth of each node as depth. In step 2, all the index nodes with a depth different than the maximum depth of the subtree are retrieved by the checker, which are the characteristics of the retrieved information in this example. In step 3, a verification is executed by the checker to determine whether any node in step 2 are directly connected to leaf nodes, which is a condition of the constraint in this example. If there are such nodes, then the subtree is determined to be not balanced.

In the illustrated embodiment, the checker 318 is not configured or programmed to have a repair phase functionality since the snapshot management module 106 includes such functionality, i.e., the log and recovery managers 306 and 310. However, in other embodiments, the checker 318 may be configured or programmed to have a repair phase functionality to automatically correct any consistency errors found as a result of one or more checks performed by the checker.

The visualizer 320 of the SCC system 100 operates to use the information in the snapshot metadata database 324 to visually display the snapshot metadata organized in the B+ tree snapshot structures, including internal structures or components of the B+ tree snapshot structures, in response to user requests on a computer monitor or any other mechanism. As an example, the visualizer 320 may display map nodes and their links for a particular B+ tree structure or entries of a group of map nodes for a particular B+ tree structure. The visualizer 320 may use declarative query language, e.g., SQL, to extract information from the snapshot metadata database 324 in order to create graphics related to the B+ tree snapshot structures to display.

The analytics unit 322 of the SCC system 100 operates to use the information in the snapshot metadata database 324 to characterize the snapshot metadata organized in the B+ tree snapshot structures using declarative query language, e.g., SQL, which may provide valuable insight into the current B+ tree snapshot structures. Traditional approaches that directly operate on the stored media require handling of reordering, paging and aggregating on raw data set, which introduces overhead when the data set is large. In contrast, the analytics unit 322 uses an intermediate data representation, i.e., the snapshot metadata database 324, which allows for the use of existing database functionalities. In a particular implementation, the analytics unit 322 uses a set of aggregate functions in SQL to compute and aggregate statistics for each node and entry. Incorporating these functions with existing SQL functions greatly improves the module reuse and programmability. As an example, the analytics unit 322 may be used to study different workloads to understand the impact of retention on performance of the snapshot management module 106 and its backing file layout by looking non-consecutive extents distance distribution of snapshot data backing files of particular I/O. The analytics unit 322 may be used to perform other analytics with respect to the snapshots created by the snapshot management module 106

Figure 4:
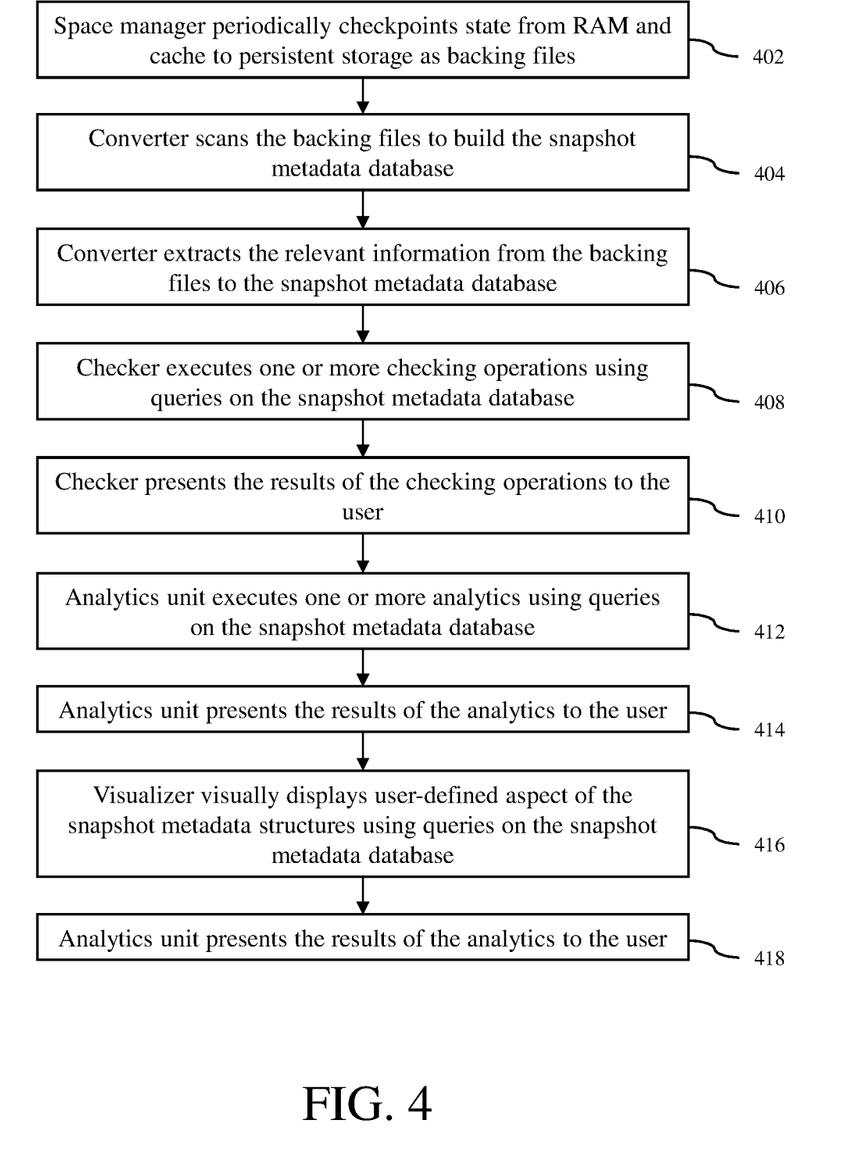
FIG. 4 is a process flow diagram of operation of the SCC system and the snapshot management module with respect to snapshot checking and characterization in accordance with an embodiment of the invention.

The operation of the snapshot management module 106 and the SCC system 100 with respect to snapshot checking and characterization will now be described with references to the flow diagram of FIG. 4, as well as the block diagram of FIG. 3. At block 402, the space manager 308 of the snapshot management module 106 periodically checkpoints state from RAM (represented by the in-RAM state 314 in FIG. 3) and the cache 304 to persistent storage, i.e., the data storage 104. That is, the state from the RAM and the cache are written into storage as backing files. The RAM includes snapshot metadata maps that have not yet been checkpointed. The cache includes metadata blocks that have not yet been checkpointed. This step is illustrated in FIG. 3 by an arrow A from the space manager 308 to block 326.

Next, at block 404, the converter 316 of the SCC system 100 scans the backing files to build the snapshot metadata database 324. In an embodiment, the converter 316 sequentially reads the backing files to search for relevant information in the backing files to be used in the snapshot metadata database. This step is illustrated in FIG. 3 by an arrow B from blocks 328 to the converter 316. At block 406, the converter extracts the relevant information from the backing files to the snapshot metadata database 324. This step may involve inserting or updating data in the right table fields of the snapshot metadata database. This step is illustrated in FIG. 3 by an arrow C from the converter 316 to the snapshot metadata database 324.

Next, at block 408, the checker 318 of the SCC system 100 executes one or more checking operations using queries, such as SQL queries, on the snapshot metadata database 324. The checking operations performed by the checker 318 may include the operations listed in Table 2. In some embodiments, the checking operations are executed in response to user input. This step is illustrated in FIG. 3 by an arrow D from the checker 318 to the snapshot metadata database 324. At block 410, the checker presents the results of the checking operations to the user. The results may indicate if the checking operations were successful or whether there were any errors. The results of the checking operations may be graphically presented on a display, for example, in a graphic user interface, for the user to view. In addition, the results may be accompanied by a sound notification to indicate whether a particular checking operation was successful or whether there was an error.

Next, at block 412, the analytics unit 322 of the SCC system 100 executes one or more analytics using queries, such as SQL queries, on the snapshot metadata database 324. The analytics performed by the analytics unit may include, for example, a study on the impact of retention for different workloads on performance of the snapshot management module 106 and its backing file layout. In some embodiments, the analytics performed by the analytics unit 322 are executed in response to user input. This step is illustrated in FIG. 3 by an arrow E from the analytics unit 322 to the snapshot metadata database 324. At block 414, the analytics unit 322 presents the results of the analytics to the user. Similar to the results of the checking operations, the results of the analytics may be graphically presented on a display, for example, in a graphic user interface, for the user to view. In addition, the results may be accompanied by a sound notification to indicate whether particular analytics was successful or whether there was an error.

Next, at block 416, the visualizer 320 of the SCC system 100 visually displays user-defined aspect of the snapshot metadata structures, which may be COW B+ tree structures, using queries, such as SQL queries, on the snapshot metadata database 324. As an example, the visualizer may display an entire snapshot metadata tree or some portion of the snapshot metadata tree, including any internal structures of the snapshot metadata tree, on a display, for example, in a graphic user interface, for the user to view. Thus, a user can easily view various aspects of the snapshot metadata structures, including their internal structures. This step is illustrated in FIG. 3 by an arrow F from the visualizer 320 to the snapshot metadata database 324.

In some embodiments, the SCC system 100 can operate online, as well as offline. In these embodiments, the SCC system may incorporate in-RAM state in the snapshot metadata database 324 when operating online so that the snapshot metadata database contains the most current information regarding snapshots. This process is illustrated in FIG. 3 by an arrow G from the in-RAM state 314 to the snapshot metadata database 324.

Figure 5:
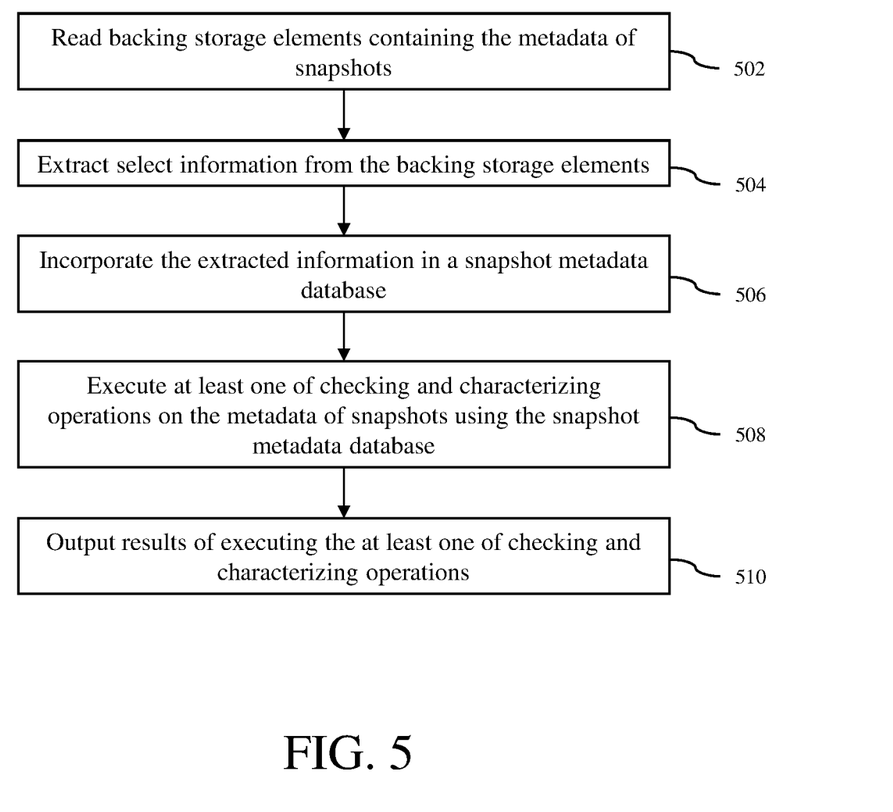
FIG. 5 is a flow diagram of a method for checking and characterizing metadata of snapshots in accordance with an embodiment of the invention.

A method for checking and characterizing metadata of snapshots in accordance with an embodiment of the invention is described with reference to a flow diagram of FIG. 5. At block 502, backing storage elements, e.g., stored backing files or objects, containing the metadata of snapshots are read. As an example, the backing storage elements may be backing files containing metadata of VM snapshots. At block 504, select information is extracted from the backing storage elements, such as oid, offset and other elements in Table 1. At block 506, the extracted information is incorporated in a snapshot metadata database. At block 508, at least one of checking and characterizing operations on the metadata of snapshots is executed using the snapshot metadata database. At block 510, results of executing the checking and characterizing operation is outputted to correct any consistency error with respect to storing of the snapshots. As an example, the results of the checking and charactering operation may be displayed on a computer monitor for the user to view.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for checking and characterizing metadata of snapshots, the method comprising:
   reading backing storage elements containing the metadata of snapshots, wherein the metadata of snapshots is organized in tree structures;
   extracting select information of the metadata of snapshots from the backing storage elements;
   incorporating the extracted select information in a snapshot metadata database, wherein the snapshot metadata database is separate from the metadata of snapshots stored in the backing storage elements and wherein the snapshot metadata database includes a table of nodes that includes select information of all nodes in the tree structures, a table of leaf nodes that includes select information of leaf nodes in the tree structures, a table of non-leaf nodes that includes select information of non-leaf nodes in the tree structures and a table of free logical block addresses (LBAs) that includes select information of free LBAs of the tree structures;
   executing at least one consistency check operation on the metadata of snapshots stored in the backing storage elements using the snapshot metadata database, wherein the at least one consistency check operation includes accessing the snapshot metadata database to retrieve information for at least a portion of the tree structures of the metadata of snapshots that is relevant to a constraint of the tree structures, verifying whether characteristics of the retrieved information satisfy the constraint, and determining that the constraint is met if the characteristics of the retrieved information satisfy the constraint; and
   outputting results of executing the at least one consistency check operation to correct any consistency error with respect to storing of the snapshots.

2. The method of claim 1, wherein the tree structures are copy-on-write tree structures, and wherein the snapshot metadata database is a relational database.

3. The method of claim 2, further comprising displaying at least a portion of the copy-on-write tree structures using information contained in the snapshot metadata database.

4. The method of claim 1, wherein executing the at least one consistency operation on the metadata of snapshots includes making at least one query on the snapshot metadata database.

5. The method of claim 4, wherein making the at least one query on the snapshot metadata database includes making at least one Structured Query Language (SQL) query on the snapshot metadata database.

6. The method of claim 1, wherein the metadata of snapshots are metadata of virtual machine snapshots and metadata of linked clones.

7. The method of claim 1, wherein the extracted select information of the metadata of snapshots that is incorporated in the snapshot metadata base includes, for each leaf or non-leaf node, an identification of a parent node for that node and the storage location of the parent node.

8. A non-transitory computer-readable storage medium containing program instructions for checking and characterizing metadata of snapshots, wherein execution of the program instructions by one or more processors of a computer system causes the one or more processors to perform steps comprising:
   reading backing storage elements containing the metadata of snapshots, wherein the metadata of snapshots is organized in tree structures;
   extracting select information of the metadata of snapshots from the backing storage elements;
   incorporating the extracted select information in a snapshot metadata database, wherein the snapshot metadata database is separate from the metadata of snapshots stored in the backing storage elements and wherein the snapshot metadata database includes a table of nodes that includes select information of all nodes in the tree structures, a table of leaf nodes that includes select information of leaf nodes in the tree structures, a table of non-leaf nodes that includes select information of non-leaf nodes in the tree structures and a table of free logical block addresses (LBAs) that includes select information of free LBAs of the tree structures;
   executing at least one consistency check operation on the metadata of snapshots stored in the backing storage elements using the snapshot metadata database, wherein the at least one consistency check operation includes accessing the snapshot metadata database to retrieve information for at least a portion of the tree structures of the metadata of snapshots that is relevant to a constraint of the tree structures, verifying whether characteristics of the retrieved information satisfy the constraint, and determining that the constraint is met if the characteristics of the retrieved information satisfy the constraint; and
   outputting results of executing the at least one consistency check operation to correct any consistency error with respect to storing of the snapshots.

9. The computer-readable storage medium of claim 8, wherein the tree structures are copy-on-write tree structures, and wherein the snapshot metadata database is a relational database.

10. The computer-readable storage medium of claim 9, wherein executing the at least one consistency operation on the metadata of snapshots includes making at least one query on the snapshot metadata database.

11. The computer-readable storage medium of claim 10, wherein making the at least one query on the snapshot metadata database includes making at least one Structured Query Language (SQL) query on the snapshot metadata database.

12. The computer-readable storage medium of claim 9, wherein the steps further comprise displaying at least a portion of the copy-on-write tree structures using information contained in the snapshot metadata database.

13. The computer-readable storage medium of claim 8, wherein the metadata of snapshots are metadata of virtual machine snapshots and metadata of linked clones.

14. A system comprising:
   memory; and
   a processor configured to:
      read backing storage elements containing the metadata of snapshots, wherein the metadata of snapshots is organized in tree structures;
      extract select information of the metadata of snapshots from the backing storage elements;
      incorporate the extracted select information in a snapshot metadata database, wherein the snapshot metadata database is separate from the metadata of snapshots stored in the backing storage elements and wherein the snapshot metadata database includes a table of nodes that includes select information of all nodes in the tree structures, a table of leaf nodes that includes select information of leaf nodes in the tree structures, a table of non-leaf nodes that includes select information of non-leaf nodes in the tree structures and a table of free logical block addresses (LBAs) that includes select information of free LBAs of the tree structures;

execute at least one consistency check operation on the metadata of snapshots stored in the backing storage elements using the snapshot metadata database, wherein the at least one consistency check operation includes accessing the snapshot metadata database to retrieve information for at least a portion of the tree structures of the metadata of snapshots that is relevant to a constraint of the tree structures, verifying whether characteristics of the retrieved information satisfy the constraint, and determining that the constraint is met if the characteristics of the retrieved information satisfy the constraint; and output results of executing the at least one consistency check operation to correct any consistency error with respect to storing of the snapshots.

15. The system of claim 14, wherein the tree structures are copy-on-write tree structures, and wherein the snapshot metadata database is a relational database.

16. The system of claim 15, wherein the process is configured to make at least one query on the snapshot metadata database to execute the at least one consistency operation on the metadata of snapshots.

* * * * *